United States Patent
Garfinkle et al.

(10) Patent No.: US 8,762,284 B2
(45) Date of Patent: Jun. 24, 2014

(54) SYSTEMS AND METHODS FOR FACILITATING SECURE TRANSACTIONS

(75) Inventors: Norton Garfinkle, New York, NY (US); Richard Garfinkle, Chicago, IL (US)

(73) Assignee: Democracyontheweb, LLC, New York, NY (US)

(*) Notice: Subject to any disclaimer, the term of this patent is extended or adjusted under 35 U.S.C. 154(b) by 189 days.

(21) Appl. No.: 12/970,414

(22) Filed: Dec. 16, 2010

(65) Prior Publication Data

US 2012/0158593 A1    Jun. 21, 2012

(51) Int. Cl.
*G06Q 20/00* (2012.01)
*G06Q 20/38* (2012.01)

(52) U.S. Cl.
CPC .......... *G06Q 20/382* (2013.01); *G06Q 20/3823* (2013.01); *G06Q 20/383* (2013.01)
USPC .................. 705/74; 705/64; 705/65; 705/66; 705/67; 705/39

(58) Field of Classification Search
USPC .................................................. 705/64–670
See application file for complete search history.

(56) References Cited

U.S. PATENT DOCUMENTS

| | | | | |
|---|---|---|---|---|
| 5,883,810 | A * | 3/1999 | Franklin et al. | 700/232 |
| 5,987,440 | A * | 11/1999 | O'Neil et al. | 705/44 |
| 6,081,793 | A | 6/2000 | Challener et al. | |
| 6,163,771 | A * | 12/2000 | Walker et al. | 705/18 |
| 6,327,578 | B1 | 12/2001 | Linehan | |
| 6,839,692 | B2 * | 1/2005 | Carrott et al. | 705/64 |
| 6,931,382 | B2 | 8/2005 | Laage et al. | |
| 7,003,493 | B2 * | 2/2006 | Weichert et al. | 705/39 |
| 7,055,742 | B2 | 6/2006 | Sinha | |
| 7,162,640 | B2 | 1/2007 | Heath et al. | |
| 7,197,167 | B2 | 3/2007 | Chung et al. | |
| 7,225,156 | B2 | 5/2007 | Fisher et al. | |
| 7,346,586 | B1 * | 3/2008 | Walmsley | 705/64 |
| 7,431,209 | B2 | 10/2008 | Chung | |
| 7,458,512 | B2 | 12/2008 | Colson et al. | |
| 7,461,787 | B2 | 12/2008 | Chung | |
| 7,490,768 | B2 | 2/2009 | Seliger et al. | |
| 7,549,049 | B2 | 6/2009 | Bogasky et al. | |
| 7,561,724 | B2 | 7/2009 | Chung et al. | |
| 7,571,142 | B1 | 8/2009 | Flitcroft et al. | |

(Continued)

FOREIGN PATENT DOCUMENTS

WO    WO2007/064884    6/2007

OTHER PUBLICATIONS

Schneier, Bruce, "Applied Cryptography", 1996, Wiley & Sons, Inc.*

(Continued)

*Primary Examiner* — Steven Kim
(74) *Attorney, Agent, or Firm* — K&L Gates LLP (57) ABSTRACT

Various embodiments are directed to methods for generating proxy account data for a financial account and authorizing payment from an account of a customer based on proxy account data. Example methods may comprise selecting a serial number for a first customer and storing an association between the serial number and an account of the first customer. The methods may further comprise encrypting the serial number and consolidating the encrypted serial number with checkable data. An association between the encrypted serial number and the checkable data may be stored and the consolidated encrypted serial number and checkable data may be encrypted to generate proxy account data.

24 Claims, 7 Drawing Sheets

(56) References Cited

U.S. PATENT DOCUMENTS

| | | | |
|---|---|---|---|
| 7,631,193 B1 | 12/2009 | Hoffman | |
| 7,635,087 B1 | 12/2009 | Chung et al. | |
| 7,637,429 B2 | 12/2009 | Cordery et al. | |
| 7,640,181 B2 | 12/2009 | McClure et al. | |
| 7,729,991 B2 | 6/2010 | Rodriguez et al. | |
| 7,774,594 B2 | 8/2010 | Lopez et al. | |
| 7,849,513 B1 | 12/2010 | Weber | |
| 7,996,288 B1* | 8/2011 | Stolfo | 705/35 |
| 8,380,177 B2* | 2/2013 | Laracey | 455/414.1 |
| 8,549,279 B1* | 10/2013 | Sahasranaman et al. | 713/150 |
| 8,578,176 B2* | 11/2013 | Mattsson | 713/193 |
| 8,584,251 B2* | 11/2013 | McGuire et al. | 726/26 |
| 2001/0029485 A1* | 10/2001 | Brody et al. | 705/39 |
| 2001/0032192 A1* | 10/2001 | Putta et al. | 705/76 |
| 2002/0062281 A1* | 5/2002 | Singhal | 705/39 |
| 2002/0112171 A1 | 8/2002 | Ginter et al. | |
| 2003/0061170 A1* | 3/2003 | Uzo | 705/64 |
| 2003/0069857 A1* | 4/2003 | Junda | 705/74 |
| 2005/0132194 A1* | 6/2005 | Ward | 713/176 |
| 2005/0218224 A1 | 10/2005 | Boldin | |
| 2005/0246528 A1 | 11/2005 | Powers et al. | |
| 2005/0268334 A1 | 12/2005 | Hesselink et al. | |
| 2006/0080545 A1 | 4/2006 | Bagley | |
| 2006/0229991 A1 | 10/2006 | Campagna | |
| 2006/0280191 A1 | 12/2006 | Nishida et al. | |
| 2007/0050303 A1* | 3/2007 | Schroeder et al. | 705/67 |
| 2007/0051804 A1 | 3/2007 | Anderson | |
| 2007/0192245 A1 | 8/2007 | Fisher et al. | |
| 2007/0246534 A1 | 10/2007 | Feldcamp et al. | |
| 2008/0028206 A1 | 1/2008 | Sicard | |
| 2008/0110985 A1 | 5/2008 | Cohen et al. | |
| 2008/0179399 A1 | 7/2008 | Phillips | |
| 2008/0201643 A1 | 8/2008 | Nagaitis et al. | |
| 2008/0222417 A1 | 9/2008 | Downes et al. | |
| 2008/0230594 A1 | 9/2008 | Anderson et al. | |
| 2008/0294559 A1 | 11/2008 | Wield et al. | |
| 2008/0319905 A1* | 12/2008 | Carlson | 705/44 |
| 2009/0006860 A1 | 1/2009 | Ross | |
| 2009/0034716 A1 | 2/2009 | Teranishi | |
| 2009/0044246 A1 | 2/2009 | Sheehan et al. | |
| 2009/0070583 A1 | 3/2009 | Von Mueller et al. | |
| 2009/0072032 A1 | 3/2009 | Cardone et al. | |
| 2009/0106092 A1 | 4/2009 | Bowers | |
| 2009/0121019 A1 | 5/2009 | Bauchot et al. | |
| 2009/0144135 A1 | 6/2009 | Jorba et al. | |
| 2009/0230192 A1 | 9/2009 | Ghafarzaideh | |
| 2009/0249082 A1* | 10/2009 | Mattsson | 713/193 |
| 2009/0299841 A1 | 12/2009 | Bishop et al. | |
| 2010/0268650 A1 | 10/2010 | Dare et al. | |
| 2011/0066497 A1 | 3/2011 | Gopinath et al. | |
| 2011/0161233 A1* | 6/2011 | Tieken | 705/71 |
| 2012/0041881 A1* | 2/2012 | Basu et al. | 705/67 |
| 2012/0143759 A1* | 6/2012 | Ritorto, Jr. et al. | 705/44 |

OTHER PUBLICATIONS

"Visa Best Practices for Tokenization Version 1.0", Jul. 14, 2010, Visa.*

U.S. Appl. No. 12/872,523, filed Aug. 31, 2010.

Search Report and Written Opinion dated Apr. 23, 2012 issued for International PCT Application No. PCT/US2011/064923 filed Dec. 14, 2011.

U.S. Appl. No. 13/079,495 filed Apr. 4, 2011.

* cited by examiner

Figure 7

SYSTEMS AND METHODS FOR FACILITATING SECURE TRANSACTIONS

RELATED APPLICATION

This application is related to U.S. application Ser. No. 12/872,523 filed on Aug. 31, 2010 entitled, "Systems and Methods for Voting," which is incorporated herein by reference in its entirety.

BACKGROUND

The structure of most credit and debit transactions today is based on the original form of a standard credit card transaction. Such a transaction typically involved the use of a physical card and a physical signature as a means of protection against misuse. In an era of face-to-face transactions, this structure provided adequate security against improper and/or fraudulent purchases. Advancing technology and purchaser demand, however have led to new variations of the standard credit card transaction that do not require either the physical presentment of the card or the signature of the purchaser. Although these new techniques provide purchasers and vendors with increased convenience, they also reduce security and increase the probability of fraudulent purchases.

Strains on the security of the standard credit card transaction began to appear, when it became possible to make credit card purchases over the phone. In a telephone transaction, the only information necessary to complete a purchase is the account number (i.e., credit or debit card number), the account expiration date and, sometimes, an additional security code (i.e., typically 3 or 4 additional digits). As a result, any person able to acquire the account number, expiration date and security code of a credit or debit account is able to make fraudulent telephone purchases on the account. Internet purchases suffer from the same security flaws as telephone purchases, though amplified by the nature of the Internet medium. Like telephone transactions, Internet transactions can be completed with only the account number, expiration date and security code associated with an account. In an Internet transaction, however, this information is transmitted over the Internet or other public network, creating additional opportunities for the theft of account information. The transmission itself is subject to interception, either in transit or at the purchaser's machine (i.e., via a Trojan horse, spyware, or other malware). Further many vendors retain purchasers' account information on the vendors' own systems. Accordingly, a purchaser's account information is at the mercy of security precautions taken by each vendor with which the purchaser does business. Still newer purchasing technology threatens to further undermine the security of credit and debit transactions. Recently there has been a push to use mobile phones and other hand-held devices in place of credit cards, allowing for purchases over the Internet and in-store using WIFI and other mobile networks. The use of mobile networks creates additional opportunities for the misappropriation of account information.

Various attempts have been made to address the security shortcomings of the standard credit card transaction. For example, there has been a proliferation of gift cards, and prepaid cash equivalents. The fixed balance of these cards limits that amount that can be lost to theft, however, it also limits the usefulness of the card to legitimate purchasers. Further, many gift cards are usable only with a certain vendor or vendors. Also, some Internet purchases now utilize high security proxies to perform transactions and transmit payment information to the vendor. These methods, however, are often complicated and require the involvement of a third party (i.e., the high security proxy).

FIGURES

Various embodiments of the present invention are described here by way of example in conjunction with the following figures, wherein.

DESCRIPTION

Various embodiments are directed to systems and methods for facilitating secure transactions utilizing proxy account data that is sequentially encrypted (e.g., by separate computer systems). The proxy account data may be associated with a financial account of a customer and may be used to authorize charges to the customer's account (e.g., to fund transactions with third-party vendors). For example, the proxy account data may be utilized to make on-line, telephone, and/or other purchases in a manner similar to the way that the customer would use actual account data. Each instance of proxy account data may be referred to as a proxy account data package.

Proxy account data may be generated by a financial institution (or a third party provider) utilizing a sequential encryption. For example, an inner financial institution computer system (inner system) may associate a serial number with the customer's account. The serial number may be any suitable number and may be associated with the customer's account in any suitable manner. The inner system may encrypt the serial number and send the encrypted serial number to an outer financial institution computer system (outer system). The outer system may append checkable data to the encrypted serial number and then encrypt the combination of the encrypted serial number and the checkable data. In this way, the serial number may be double encrypted. The results of the encryption may yield the proxy account data. The proxy account data may then be communicated to the customer in any suitable manner.

According to various embodiments, the customer may utilize the proxy account data by providing it to a vendor in person, by telephone, or electronically, in a manner similar to the way that the customer would provide his or her credit card number. The vendor, or other party, may provide the proxy account data to the financial institution along with a request for payment. The proxy account data and request may be processed by the inner and outer systems. The outer system may decrypt the proxy account data, yielding the encrypted serial number and the checkable data. The checkable data may be verified. Provided that the checkable data is verified, the outer system may transmit the checkable data to the inner system. The inner system may decrypt the encrypted serial number and verify that the serial number is properly associated with the customer's account. Provided that the serial number is properly associated with the customer's account, the financial institution may authorize that the customer's account be charged in a manner consistent with the payment request. In this way, the vendor never has access to the customer's account information. Accordingly, the customer's account information remains with the financial institution, protected by the Internet security systems already in place to protect the financial institution's computer systems.

In various embodiments, proxy account data may be associated with transaction limitations that may be honored by the financial institution. For example, the serial number and/or checkable data of the proxy account data may be associated with any suitable type of transaction limitation including, for example, a maximum amount available for transactions, a maximum per-transaction amount, a limitation on vendors, an expiration time, and/or any other suitable limitation. In embodiments where the proxy account data is associated with limitations, the limitations may be derived at the time that the proxy account data is provided to the financial institution with a request for payment. For example, the financial institution may not authorize payment from the customer's account to the vendor unless the details of the transaction are consistent with the transaction limitations associated with the proxy account data.

Figure 1:
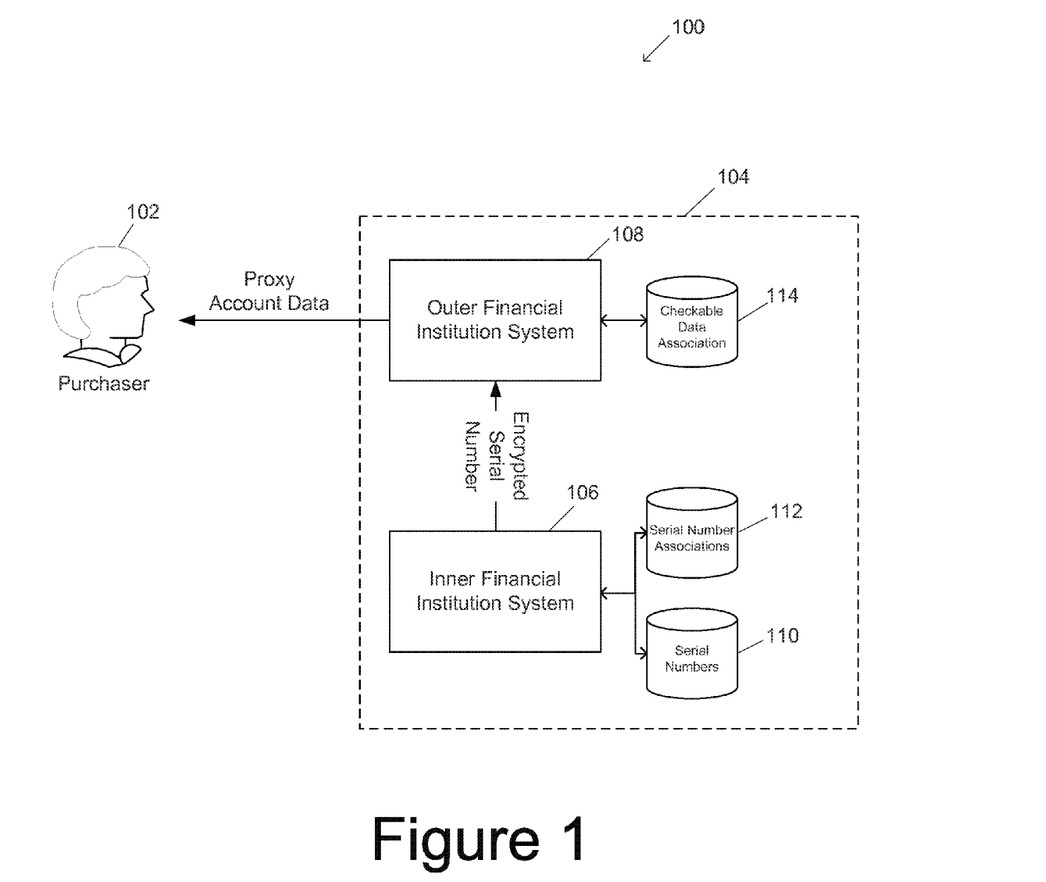
FIG. 1 illustrates a block diagram of a system for generating proxy account data for customers of a financial institution.

FIG. 1 illustrates a block diagram of a system 100 for generating proxy account data for customers of a financial institution. A customer 102 may interact with a computer system 104 to obtain proxy account data. According to various embodiments, the computer system 104 may constitute all or part of a computer system of a financial institution (e.g., the financial institution providing the customer 102 with the account to be drawn on using the proxy account data). The customer 102 may be in communication with the system 104, for example, utilizing a secure connection and/or user interface that may, in various embodiments, already be in place for the customer 102 to conduct banking business with the financial institution. In some embodiments, the computer system 104 may be provided by a third party service provider and may be in secure communication with a computer system (not shown) of the financial institution.

According to various embodiments, the computer system 104 may comprise an outer financial institution system 108 and an inner financial institution system 106. The inner 106 and outer systems 108 may be separated from one another, for example, in order to increase the difficulty of hacking into both systems 106, 108. For example, according to various embodiments, the systems 106, 108 may be at different physical locations, on different networks, behind different firewalls, etc. In some embodiments, however, there may not be any distinction between the inner system 106 and outer system 108 (e.g., the functionality of both may be performed by the system 104 or a single component thereof).

The inner system 106 may be in communication with one or more data stores including, for example, a serial number data store 110 and a serial number association data store 112. Although the data stores 110 and 112 are illustrated as separate components, it will be appreciated that the data described as being stored at each may be stored in more or fewer physical or logical devices than are shown. Serial number data store 110 may comprise serial numbers that may be associated with customer account data. Serial number associations data store 112 may comprise associations between serial numbers and specific customer account data. The outer system 108 may similarly be in electronic communication with a checkable data association data store 114. The data store 114 may comprise associations between encrypted serial numbers and checkable data, for example, as described herein below.

Figure 2:
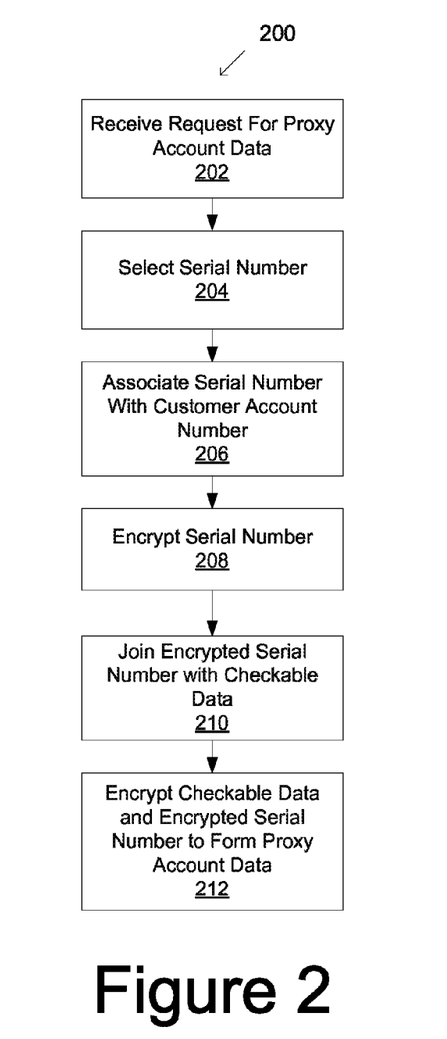
FIG. 2 illustrates one embodiment of a process flow for generating proxy account data for customers of a financial institution utilizing the system of FIG. 1.

FIG. 2 illustrates one embodiment of a process flow 200 for generating proxy account data for customers of a financial institution utilizing the system 100. At 202, the system 104 may receive a request for proxy account data (e.g., from the customer 102). The request may be received in any suitable manner. According to various embodiments, the customer 102 may access the system 104 according to a secure connection and request one or more proxy account data packages in any suitable way. For example, the system 104 may provide the customer with a user interface (not shown) allowing the customer to request proxy account data. In various embodiments (e.g., when the system 104 is implemented directly by a financial institution) functionality for allowing the customer 102 to request proxy account data may be provided as part of a user interface that also provides the user 102 with various tools for managing the customer's account or accounts with the financial institution (e.g., balance inquiry and transfer tools, electronic bill payment tools, electronic statement tools, etc.). In some embodiments, it may not be necessary for the customer 102 to request proxy account data. For example, the system 104 may be configured to automatically provide the customer 102 with a predetermined number of proxy account data packages (e.g. periodically). For example, the customer's account with the financial institution may include a feature where the financial institution provides the customer 102 with a predetermined number of proxy account data packages every month.

At 204, the system 104 (e.g., the inner system 106) may select a serial number to be used to generate the proxy account data. The serial number may be a block of digital data of any suitable size that is capable of being associated with the customer's account data (e.g., account number, expiration date, security code, etc.). In various embodiments, a list of suitable serial numbers may be stored by the inner system 106, for example, at the serial number store 110. In some embodiments, the serial number may be all or a portion of account data specifically identifying the customer's account. It will be appreciated, however, that utilizing account data for the serial number will cause the account data to be present in the ultimately generated proxy account data, albeit in encrypted form. In some embodiments, the inner system 106 may keep track of serial numbers that have already been used to ensure that no serial number is in use for more than one account and/or more than one customer at the same time. It will be appreciated, however, that, in some embodiments, serial numbers may be re-used after all account proxy data representing previous uses of the serial number have expired.

At 206, the inner system 106 may associate the selected serial number with data describing the customer's account. The data describing the customer's account may include, for example, an account number or any other identifying data. The association between the serial number and the customer's account may be stored at any suitable secure location including, for example, at the serial number associations data store 112. After making the association at 204, the inner system 106 may encrypt the serial number at 206. Upon encryption of the serial number, the inner system 106 may transmit the encrypted serial number to the outer system 108 according to any suitably secure transmission technique using any suitable local or wide area, wired, wireless or mixed network.

It will be appreciated that the serial number may be encrypted by the inner system 106 according to any suitable encryption hardware or software method. For example, the inner system 106 may encrypt the serial number according to a symmetric, single key encryption method such as, for example, forms of the Advanced Encryption Standard (AES), Data Encryption Standard (DES), RC2, RC4, etc. Any suitable block size may be used. Also, according to various embodiments, an asymmetric or public-key infrastructure (PKI) encryption method may be used. For example, the inner system 106 may have a public key used to encrypt the serial number and a private key that may be used to decrypt the data packet. The public key may be generally available, while the private key may not be shared with any other systems. In some embodiments, symmetric and asymmetric encryption methods may be used together. For example, an asymmetric method may be used to transmit a symmetric key that may then be used for further communications.

At 210, the outer system 108 may join the encrypted serial number with checkable data. The checkable data may be any suitable data that can be later used by the outer system 108 to verify the encrypted serial number. In some embodiments, the checkable data may comprise data describing the customer 102 and/or the customer's account. In addition, or instead, the checkable data may comprise a time stamp and/or machine stamp indicating the outer system 108. In this way, the outer system 108 may be able to subsequently verify that it created the resulting proxy account data. In some embodiments, the checkable data may comprise any type of data that may be associated with the encrypted serial number. For example, the outer system 108 may store an association between the encrypted serial number and the checkable data at data store 114.

The outer system 108 may encrypt the combination of the encrypted serial number and the checkable data at 212. The result of this encryption may be, or may be transformed into, the proxy account data. The proxy account data may subsequently be communicated to the customer 102 in any suitable manner. For example, the proxy account data may be printed to a paper or card, which may be subsequently mailed to the customer 102 (e.g., with an account statement). The proxy account data may be represented on the paper or card in any suitable form. For example, the proxy account data may be represented in alphanumeric form, in symbolic for, or as a bar code or other graphical code. In various embodiments, the proxy account data may be provided to the customer 102 electronically. For example, the system 104 may send an e-mail to the customer 102 including the proxy account data. The e-mail may be sent to a public e-mail account of the customer 102 and/or to a secure e-mail account associated with the customer's account with the financial institution. In various embodiments, the e-mail may comprise an electronic representation of the proxy account data that may be utilized by a personal computer device, such as a smart phone, to make purchases as described herein. Also, in various embodiments, the proxy account data may be provided to the customer 102 via a user interface provided by the system 104. For example, the proxy account data may be represented in a screen provided to the customer 102. The customer 102 may then copy the proxy account data (e.g., electronically or manually) for later use.

According to various embodiments, instances of proxy account data (e.g., proxy account data packages) may be associated with use restrictions that limit the circumstances under which the proxy account data may be used in transactions with vendors. For example, some use restrictions may specify times or dates when the proxy account data may, or may not, be used. Also, for example, some use restrictions may specify a maximum number of times that proxy account data may be used. In addition, some use restrictions may specify a number of times that the proxy account data may be used prior to an expiration. Other use restrictions my be related to the types of vendors that the proxy account data may be used to pay. For example, a proxy account data package may be limited such that it is only valid with certain vendors, or categories of vendors. Similarly, proxy account data may be limited so that it is specifically invalid with certain vendors or categories of vendors. In some embodiments, use restrictions may be utilized to provide a greater level of security and/or assurance with a customer's account is to be used by someone other than the customer. For example, if the customer 102 is a parent, the customer 102 may provide his or her child with a proxy account data package that is specifically limited to the types of purchases that the customer 102 would like the child to make.

Figure 3:
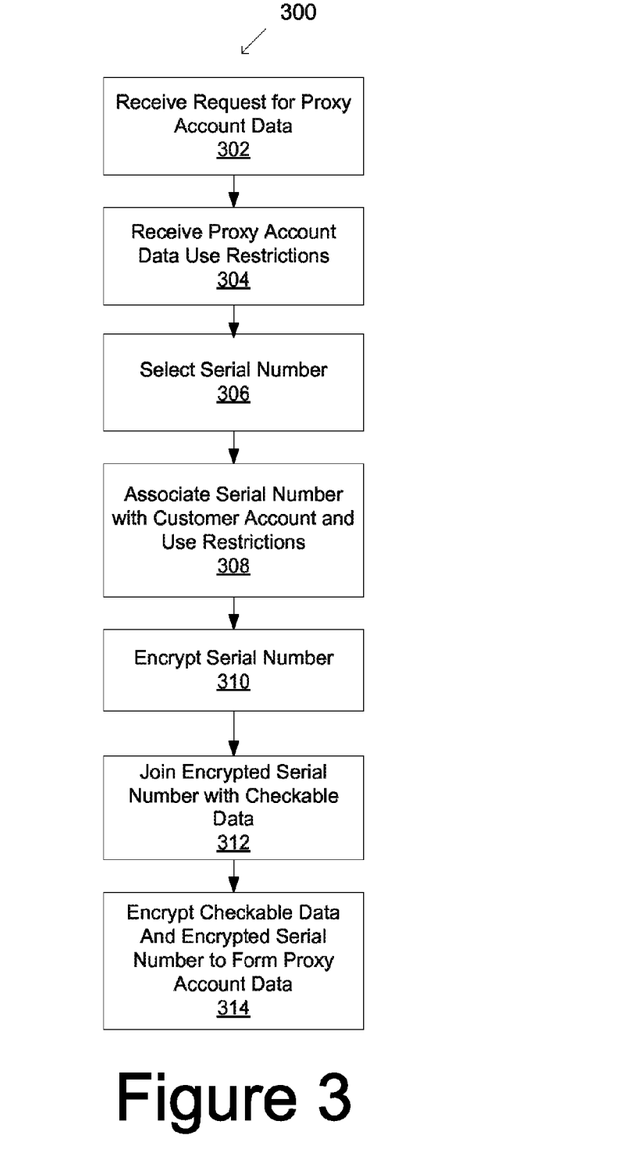
FIG. 3 illustrates one embodiment of a process flow for generating use-restricted proxy account data for customers of a financial institution utilizing the system of FIG. 1.

FIG. 3 illustrates one embodiment of a process flow 300 for generating use-restricted proxy account data for customers of a financial institution utilizing the system 100. At 302, the system 104 may receive a request for proxy account data. This action may occur in any suitable manner, for example as described above with respect to 202. Further, in some embodiments, the system 104 may generate proxy account data without having received a specific request, for example, as described above. At 304, the system 104 may receive, from the customer 102, use restrictions to be associated with the proxy account data. The use restrictions may include any suitable restriction on the types of transactions that may use the proxy account data including, for example, the restriction types discussed above. According to various embodiments, the use restrictions need not be received specifically from the customer 102 every time that a proxy account data package is generated. For example, the system 104 may store one or more pre-configured sets of use restrictions from which the customer 102 may select. Further, in some cases, the customer 102 may specify a default use restriction or set of use restrictions to be used when creating proxy account data (e.g., unless instructions to the contrary are received).

At 306, the inner system 106 may select a serial number, for example, as described hereinabove with respect to 204. At 308, the inner system 106 may associate the serial number and the use restriction or restrictions with the customer's account. In this way, when the proxy account data is used to make a purchase, the system 104 may verify the validity of the proxy account data as well as whether the requested transaction complies with the use restrictions, for example, as described herein below. Although FIG. 3 shows the use restrictions being associated with the serial number by the inner system 106, it will be appreciated that, alternatively, the encrypted serial number and/or checkable data may be associated with the use restrictions, for example, by the outer system 108.

At 310, the inner system 106 may encrypt the serial number, for example, similar to the way described above with respect to 208. The resulting encrypted serial number may be transmitted to the outer system 108, which may join the encrypted serial number with checkable data at 312, for example, as described above with respect to 210. At 314, the outer system may encrypt the combination of the checkable data with the encrypted serial number, resulting in the proxy account data.

Figure 4:
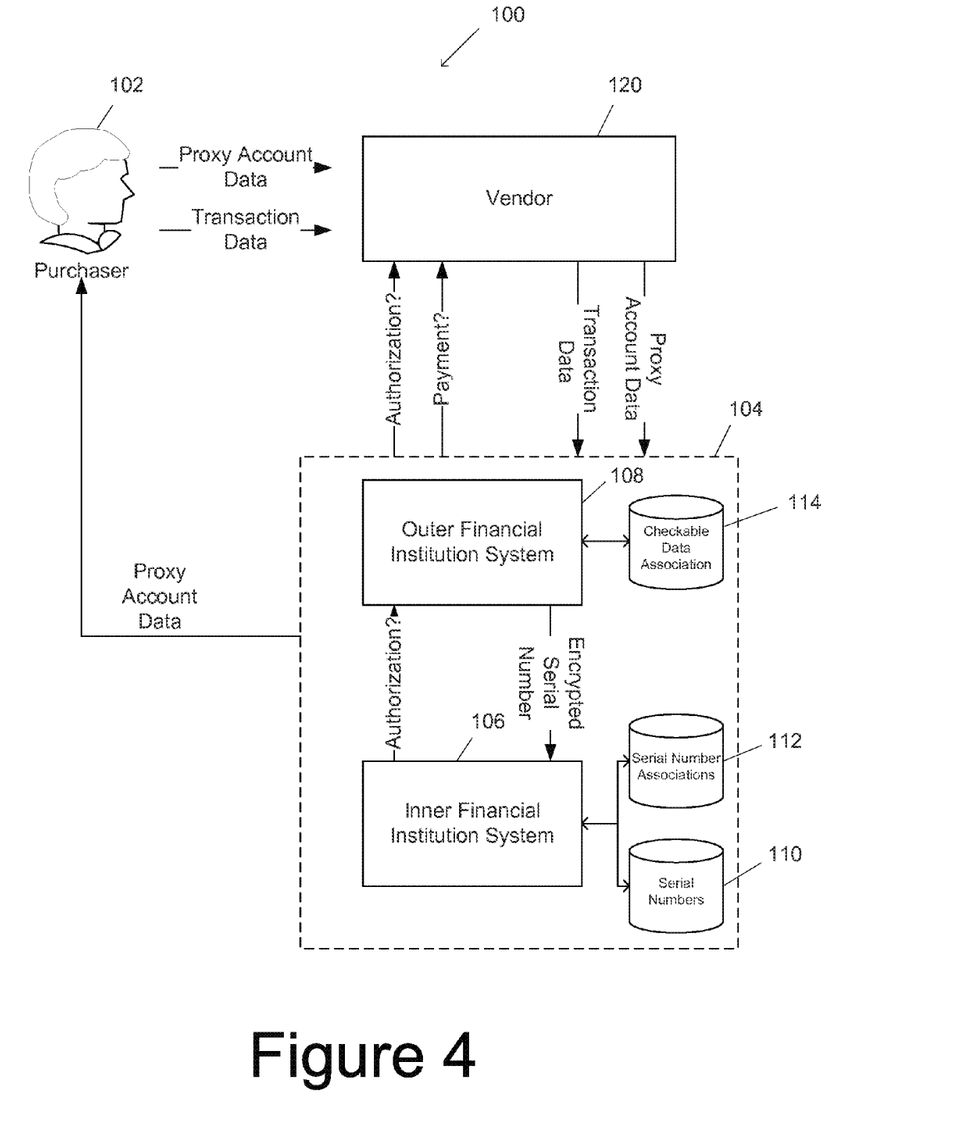
FIG. 4 illustrates one embodiment of the system of FIG. 1 showing a vendor and illustrating a transaction between the vendor and the customer utilizing proxy account data.
Figure 5:
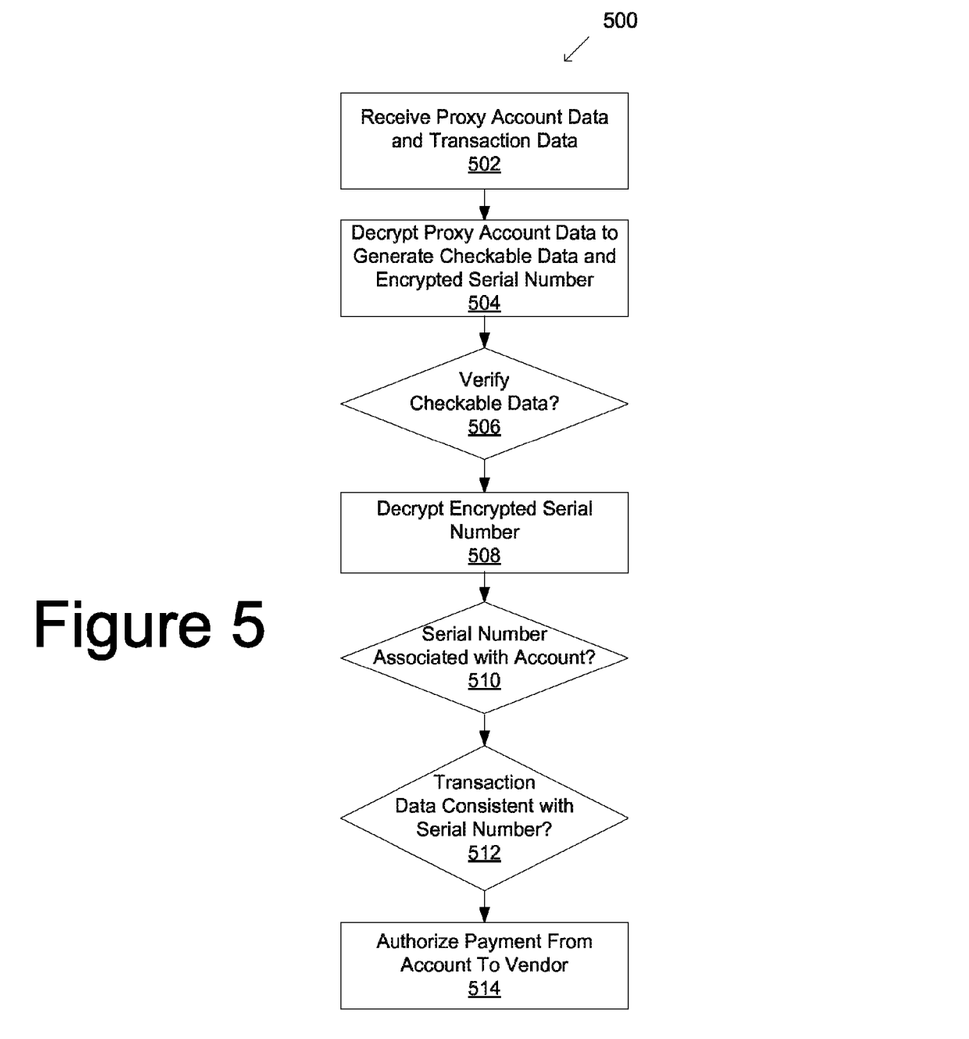
FIG. 5 illustrates one embodiment of a process flow for completing a transaction between the customer and the vendor utilizing the system of FIG. 4.

FIG. 4 illustrates one embodiment of the system 100 showing a vendor 120 and illustrating a transaction between the vendor 120 and the customer 102 utilizing proxy account data. The vendor 120 may be any suitable type of vendor providing any type of goods or services for sale to the customer 102. For example, the vendor 120 may be an online or bricks-and-mortar retailer. In other embodiments, the vendor 120 may be a utility company, or any other company or entity to which the customer 102 may owe a payment. FIG. 5 illustrates one embodiment of a process flow 500 for completing a transaction between the customer 102 and the vendor 120 utilizing the system 100, as shown in FIG. 4. The transaction may be initiated when the customer 102 pays for goods and services provided by the vendor 120 utilizing proxy account data. At 502, the system 104 may receive proxy account data and transaction data. The transaction data may describe the transaction between the customer 102 and the vendor 120 that will be completed by charging the customer's account utilizing the proxy account data. The proxy account data and transaction data may be received from the vendor 120, as shown in FIG. 4. For example, the customer 102 may provide the proxy account data to the vendor 120 in the same way that the customer 102 would provide their credit card number and similar information. Transaction data provided to the vendor 120 from the customer 102 may include, for example, a description of the good and/or service that the customer 102 would like to purchase. The vendor 120, in some embodiments, may updated the transaction data with an indication of the vendor 120 before sending to the system 104. In various embodiments, the purchaser 102 may provide the proxy account data and transaction data directly to the system 104.

At 504, the outer system 108 may decrypt the proxy account data. For example, the outer system 108 may have access to the encryption key used to encrypt the proxy account data and/or necessary to decrypt it, as described above. The result of decrypting the proxy account data may be checkable data and an encrypted serial number. At 506, the outer system 108 may verify the checkable data. For example, the outer system 108 may verify an association between the checkable data and the encrypted serial number (e.g., stored at database 114). If the checkable data is verified, the outer system 108 may transmit the encrypted serial number (and the transaction data) to the inner system 106 (e.g., via a secure connection). The inner system may decrypt the encrypted serial number at 508. At 510, the inner system 106 may determine whether the serial number is associated with a valid account (e.g., at data store 112). At 512, the inner system 106 may determine whether the transaction information is consistent with the serial number, or consistent with any use restrictions associated with the serial number (e.g., at data store 112).

Provided that the serial number is associated with a valid account and that the transaction data is consistent with any use restrictions associated with the serial number, the inner system 106 may authorize payment to the vendor 120 from the customer's account. Payment may be effectuated according to any suitable method. For example, payment from the customer's account to the vendor 120 may be made in a manner similar to that of current credit and/or debit transactions. It will be appreciated that the process flow 500, in some embodiments, may be executed by the system 104 at or near real time (e.g., with a speed similar to that of current credit card authorization determinations). In this way, the vendor 120 may wait to receive at least authorization from the system 104 prior to completing the transaction with the customer 102.

As described above, the customer 102 may provide proxy account data to the vendor 120, or directly to the system 104, in any suitable way. For example, when the vendor is an Internet or web-based vendor, the customer 102 may provide the proxy account data by entering it into a window of the vendor's site. For example, the vendor's site may comprise a drop-down menu allowing the customer 102 to select a payment method. When the customer 102 selects a method corresponding to the proxy account data, the vendor's site may provide a field for receiving the proxy account data. Also, in some embodiments, the vendor's site may comprise an interface to the system 104 allowing the customer 102 to provide the proxy account data directly to the system 104 through the vendor's site. It will be appreciated that proxy account data may also be used for in-person purchases. For example, the customer 102 may provide a card comprising the proxy account data in alphanumeric and/or symbolic form to the vendor 120. The vendor 120 may transmit the proxy account data to the system 104 by manually or automatically entering it into a vendor computer system (not shown). For example, the vendor 120 may have a bar code reader to read a bar code from the card provided by the customer. In still other embodiments, the customer 102 may verbally indicate the proxy account data to the vendor 120.

Figure 6:
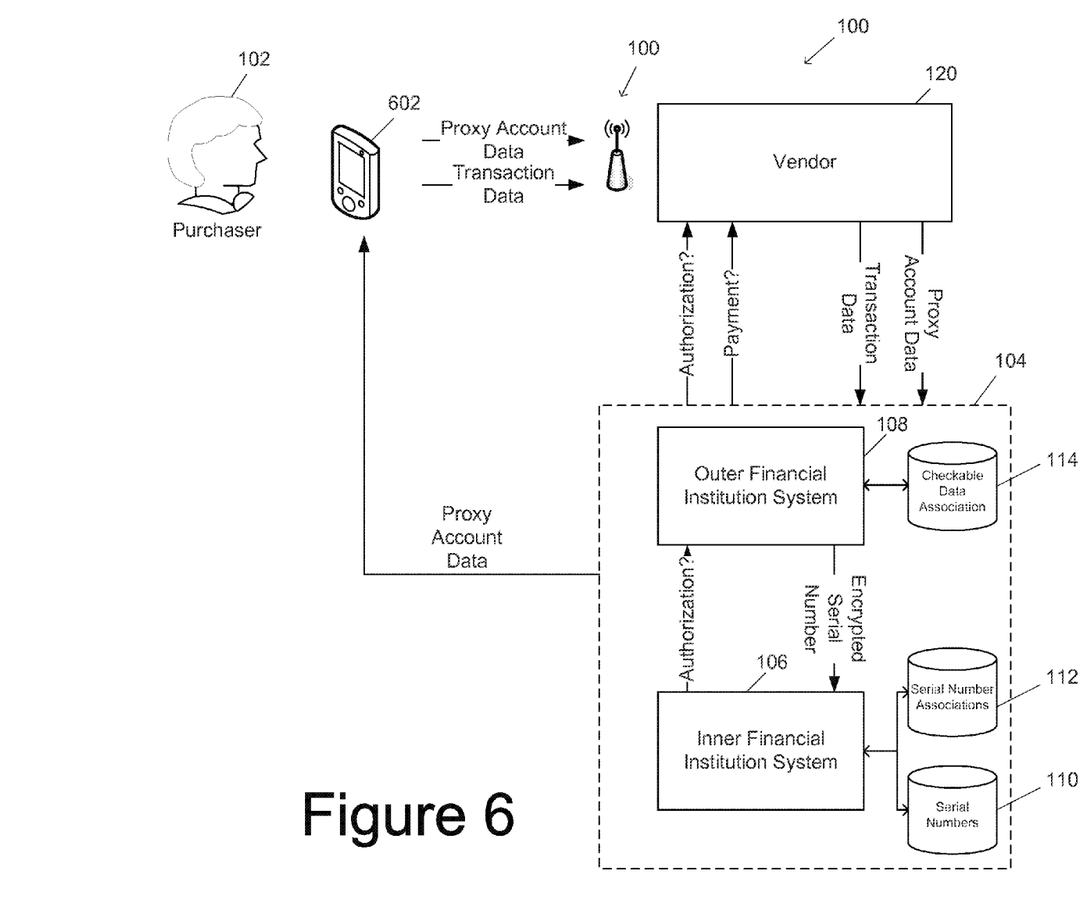
FIGS. 6 and 7 illustrate embodiments of the system of FIG. 4 depicting example transactions where the purchaser provides the proxy account data utilizing a mobile device, such as a smart phone, palmtop computer, etc.
Figure 7:
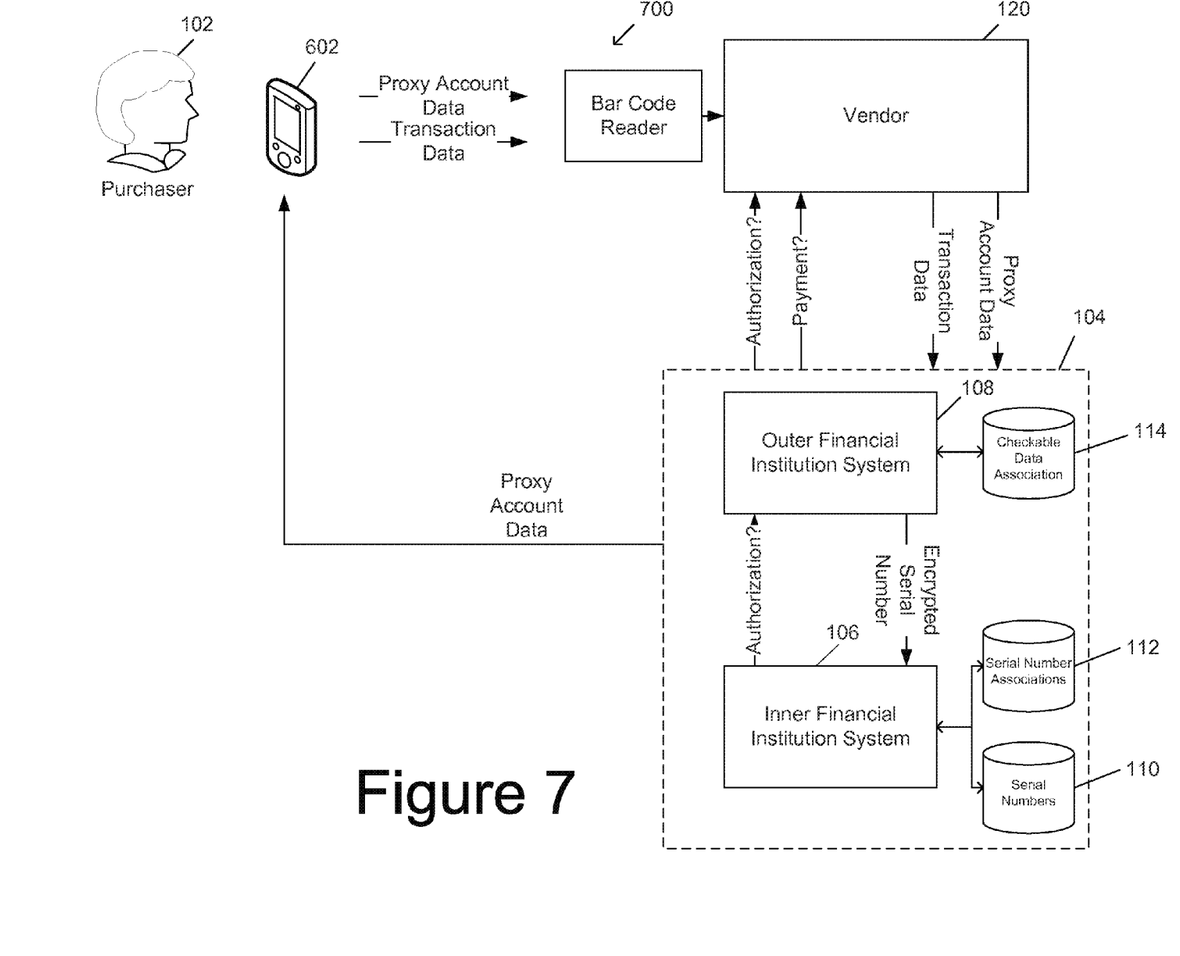

FIGS. 6 and 7 illustrate embodiments of the system 100 depicting example transactions where the purchaser 102 provides the proxy account data utilizing a mobile device, such as a smart phone, palmtop computer, etc. Referring to FIG. 6, the customer 102 may have a mobile device 602. The mobile device 602 may be any sort of mobile electronic device capable of receiving and storing proxy account data. For example, the mobile device 602 may be a general purpose mobile device such as, for example, a mobile phone, a smart mobile phone, a palmtop computer, a laptop computer, etc. In some embodiments, the mobile device 602 may be a device dedicated to facilitating payments such as, for example, a key fob a smart card comprising a microchip, etc.

As illustrated in FIG. 6, the mobile device 602 may receive the proxy account data from the system 104. For example, the mobile device 602 may communicate directly with the system 104 via a network (not shown) such as the Internet. Also, for example, the proxy account data may be stored on a storage medium, which may be read by the mobile device 602. In various embodiments, the mobile device 602 may be capable of wireless communications. The vendor 120 may comprise a wireless access device 600 for receiving wireless transmissions from the mobile device 602. When the purchaser 102 chooses to engage in a transaction with the vendor 120, the purchaser may place the mobile device in communication with the vendor 120. For example, the purchaser 102 may move the mobile device 102 within range of the wireless access device 600. Also, in some embodiments, the purchaser 102 may prompt the mobile device 602 to send the proxy account data to the vendor 120.

Referring now to FIG. 7, in some embodiments, the mobile device 602 may transmit the proxy account data to the vendor 120 utilizing a bar code or any other suitable visual and/or graphical code. For example, the mobile device 602 may be configured to represent the proxy account data on a screen in the form of a bar code or other visual and/or graphical code. The purchaser 102 may communicate the proxy account data to the vendor 120 by placing the mobile device 602 (and specifically its screen) within range of a bar code reader 700 in communication with the vendor 120. In some embodiments, the purchaser 102 may capture or extract an image of the bar code or other code and transmit the image to the vendor 120, in lieu of using the bar code reader 700. It will be appreciated that, although FIGS. 6 and 7 show the mobile device 602 sending proxy account data and transaction data to the vendor 102, in some embodiments, the mobile device 602 may send only the proxy account data. Transaction data (e.g., which items or services the purchaser 102 intends to buy) may be conveyed verbally or by another method. Also, although FIGS. 6 and 7 show the mobile device 602 communicating the proxy account data to the vendor 120, in some embodiments, the mobile device 602 may communicate the proxy account data directly to the system 104.

According to various embodiments, steps may be taken to prevent hacking of the financial institution system 104. For example, the financial institution may have security features in place to prevent unauthorized access to the system 104 and to facilitate secure communications with customers. Any suitable technology may be used including, for example, HTTPS, secure socket layer (SSL), etc. An additional security feature of the system 100 may arise from the dual nature of the inner and outer systems. For example, in order to nefariously generate proxy account data, a hacker would be required to separately hack into both systems 106, 108, which may pose a considerable challenge. Should it be determined that any decryption key of either of the systems 106, 108 has been stolen or compromised, the systems 106, 108 may generate new decryption keys and replace any proxy account data created during the time that the decryption key or keys was compromised.

Different computer systems 106, 108, parties 102, 120, and devices 602 are described herein as communicating with one another. It will be appreciated that this communication may take place according to any suitable method. For example, according to various embodiments, some or all of the computer systems or parties described herein may be in communication with one another via a network or networks. The network or networks may operate according to any suitable wired or wireless communication protocol and may utilize any suitable hardware or software. In some embodiments, the network or networks may include, a wide area network (WAN) such as the Internet, a local area network (LAN), etc.

When communications between the systems 106, 108, parties 102, 120, and devices 602 take place over the Internet or other public network, it will be appreciated that these communications may be encrypted. For example, one or more of the systems may utilize an asymmetric or public key infrastructure (PKI) method. According to a PKI system, each system may have a public key that may be used for encrypting messages and a private key that may be used for decryption. The public key may be provided to any systems having need to send data to the first system. The data may be encrypted with the public key such that it may only be decrypted with the private key, which may be kept secret by the receiving system. In this way, all communications between the various systems may be decrypted only by their intended recipients.

According to various embodiments, the systems 106, 108 may each be implemented on exclusive hardware. For example, the system 106 may not share any hardware with the system 108. This may increase security as it may make it more difficult for a potential hacker to access the sensitive operations of both system 106, 108, as would be necessary to tamper with the creation or verification of proxy account data. In other embodiments, though, the systems may share common hardware. For example, the systems 106, 108 may be implemented on a single computer device or a common set of computer devices. Hardware or software tools may be utilized to provide segregation between the systems 106, 108 in order to increase the difficulty of hacking both systems 106, 108 to tamper with the creation or verification of proxy account data. For example, a firewall may be implemented to limit the types and security of electronic communications between the system 106, 108. In some embodiments, the distinction between the inner system 106 and outer system 108 may not be present and the system 104 may generally perform all of the actions described herein and attributed to either the system 106 or the system 108. Although this configuration may be less secure, it may be advantageous in some circumstances to avoid the expense and complexity of implementing multiple systems 106, 108. Also, the systems 106 and 108 are referred to herein as the inner system 106 and the outer system 108. Despite this, it will be appreciated that these systems may be placed in any suitable configuration relative to one another, the system 104, the vendor 120 and/or the purchaser 102.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients (e.g., the vendor 120) or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

A "computer," "computer device," "computer system," "system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A computer-implemented method for generating proxy account data for a financial account, the method comprising:
   for a first customer, selecting a serial number by a first computer system, wherein the first computer system comprises at least one processor and operatively associated memory;
   storing, by the first computer system, an association between the serial number and an account of the first customer;
   encrypting, by the first computer system, the serial number;
   transmitting, by the first computer system, the encrypted serial number to a second computer system;
   consolidating, by the second computer system, the encrypted serial number with a checkable data;
   storing, by the second computer system, an association between the encrypted serial number and the checkable data;
   generating, by the second computer system, a first proxy account data, wherein the generating comprises encrypting the consolidated encrypted serial number and checkable data;
   after the encrypting of the consolidated encrypted serial number and checkable data, transmitting the first proxy account data by the second computer system to the first customer;
   receiving by the second computer system, a second proxy account data;
   retrieving, by the second computer system, an encrypted serial number and a checkable data from the second proxy account data by decrypting the second proxy account data;
   verifying, by the second computer system, the checkable data of the second proxy account data by using the stored association between the checkable data and the encrypted serial number;
   transmitting, by the second computer system, the encrypted serial number of the second proxy account data to the first computer system based on the verification of the checkable data of the second proxy account data;
   decrypting, by the first computer system, the encrypted serial number of the second proxy account data;
   verifying, by the first computer system, the decrypted serial number of the second proxy account data based on the stored association between the serial number and the account of the first customer; and
   authorizing, by the first computer system, a payment from the account of the first customer to a vendor based on the verification of the decrypted serial number of the second proxy account data.

2. The method of claim 1, wherein the first computer system and the second computer system are at different physical locations.

3. The method of claim 1, wherein the first computer system and the second computer system comprise at least one characteristic selected from the group consisting of at least one processor in common and at least one memory in common.

4. The method of claim 1, wherein the first computer system and the second computer system are separated by at least one firewall.

5. The method of claim 1, wherein the transmitting the first proxy account data by the second computer system to the first customer comprises at least one action selected from the group consisting of:
   displaying the first proxy account data on a screen to be viewed by the first customer;
   mailing a printed copy of the first proxy account data to the first customer; and
   e-mailing the first proxy account data to the first customer.

6. The method of claim 1, wherein the transmitting the first proxy account data by the second computer system to the first customer comprises transmitting the first proxy account data to a mobile device associated with the first customer.

7. The method of claim 6, wherein the mobile device is programmed to communicate the first proxy account data to a vendor using at least one action selected from the group consisting of:
   wirelessly transmitting the first proxy account data to the vendor; and
   generating an image of the first proxy account data readable by the vendor.

8. The method of claim 1, wherein the first proxy account data is in a form selected from the group consisting of an alphanumeric form and a symbolic form.

9. The method of claim 1, wherein encrypting the serial number comprises utilizing an encryption method selected from the group consisting of a symmetric encryption method and an asymmetric encryption method.

10. The method of claim 1, wherein the checkable data comprises an indication of the account.

11. The method of claim 1, wherein the checkable data comprises an indication of a timestamp.

12. The method of claim 1, further comprising associating at least one use restriction with the serial number.

13. The method of claim 1, wherein the use restriction is selected from the group consisting of: at least one vendor where the proxy account data can be used, at least one vendor where the proxy account data can not be used; a time limitation on when the proxy account data can be used; and a number of times that the proxy account data can be used.

14. The method of claim 1, further comprising associating with the first proxy account data a maximum number of times that the first proxy account data is usable for purchases.

15. The method of claim 14, wherein the associating comprises associating the maximum number of times that the first proxy account data is usable for purchases with the serial number.

16. The method of claim 14, wherein the associating comprises associating the maximum number of times that the first proxy account data is usable for purchases with the encrypted serial number.

17. The method of claim 14, wherein the associating comprises associating the maximum number of times that the first proxy account data is usable for purchases with the checkable data.

18. The method of claim 1, wherein the generating the first proxy account data for the financial account is performed by the first and second computer systems in response to a request for the proxy account data from the first customer.

19. The method of claim 1, wherein the generating the first proxy account data for the financial account is performed by the first and second computer systems automatically.

20. A system for generating proxy account data for a financial account, the system comprising:
a first computer system comprising at least one processor and operatively associated memory, the memory comprising instructions thereon that when executed by the at least one processor cause the first system to execute a method comprising:
for a first customer, selecting a serial number;
storing an association between the serial number and an account of the first customer;
encrypting the serial number;
transmitting the encrypted serial number to a second computer system;
receiving from the second computer system, an encrypted serial number of a second proxy account data;
decrypting the encrypted serial number of the second proxy account data;
verifying the decrypted serial number of the second proxy account data based on the stored association between the serial number and the account of the first customer; and
authorizing a payment from the account of the first customer to a vendor based on the verification of the decrypted serial number of the second proxy account data; and
the second computer system comprising at least one processor and operatively associated memory, the memory comprising instructions thereon that when executed by the at least one processor cause the second system to execute a method comprising:
receiving the encrypted serial number from the first computer system; consolidating the encrypted serial number with checkable data;
storing an association between the encrypted serial number and the checkable data;
generating a first proxy account data, wherein the generating comprises encrypting the consolidated encrypted serial number and checkable data;
after the encrypting of the consolidated encrypted serial number and checkable data, transmitting the first proxy account data to the first customer receiving a second proxy account data;
retrieving an encrypted serial number and a checkable data from the second proxy account data by decrypting the second proxy account data;
verifying the checkable data of the second proxy account data by using the stored association between the checkable data and the encrypted serial number.

21. The system of claim 20, wherein the first computer system and the second computer system are at different physical locations.

22. The system of claim 20, wherein the first computer system and the second computer system comprise at least one characteristic selected from the group consisting of at least one processor in common and at least one memory in common.

23. The system of claim 20, wherein the first computer system and the second computer system are separated by at least one firewall.

24. A non-transitory computer readable medium comprising instructions thereon that, when executed by at least one processor, cause the at least one processor to execute a method comprising:
for a first customer, selecting a serial number by a first computer system;
storing, by the first computer system, an association between the serial number and an account of the first customer;
encrypting the serial number, by the first computer system;
transmitting, by the first computer system, the encrypted serial number to a second computer system;
consolidating, by the second computer system, the encrypted serial number with a checkable data;
storing, by the second computer system, an association between the encrypted serial number and the checkable data;
generating, by the second computer system, a first proxy account data, wherein the generating comprises encrypting the consolidated encrypted serial number and checkable data;
after the encrypting of the consolidated encrypted serial number and checkable data, transmitting the first proxy account data by the second computer system to the first customer;
receiving, by the second computer system, a second proxy account data;
retrieving, by the second computer system, an encrypted serial number and a checkable data from the second proxy account data by decrypting the second proxy account data;
verifying, by the second computer system, the checkable data of the second proxy account data by using the stored association between the checkable data and the encrypted serial number;
transmitting, by the second computer system, the encrypted serial number of the second proxy account data to the first computer system based on the verification of the checkable data of the second proxy account data;
decrypting, by the first computer system, the encrypted serial number of the second proxy account data;
verifying, by the first computer system, the decrypted serial number of the second proxy account data based on the stored association between the serial number and the account of the first customer; and
authorizing, by the first computer system, a payment from the account of the first customer to a vendor based on the verification of the decrypted serial number of the second proxy account data.

* * * * *